United States Patent Office 3,118,767
Patented Jan. 21, 1964

3,118,767
PHOTOPOLYMERIZATION OF VINYL MONOMERS WITH METAL OXIDES AS CATALYSTS
Helene D. Evans, Blackwood, N.J., and Fritz W. H. Mueller, Binghamton, and Steven Levinos, Vestal, N.Y., assignors to General Aniline & Film Corporation, New York, N.Y., a corporation of Delaware
No Drawing. Filed May 18, 1962, Ser. No. 195,997
16 Claims. (Cl. 96—115)

The present invention relates to the formation of hard solid polymers by photopolymerizing or copolymerizing normal liquid or solid monomeric vinyl compounds while employing as the catalysts for photopolymerization a metal oxide such as zinc oxide or titanium dioxide or such oxides the catalytic effect of which is promoted by an oxidizable organic compound and to light-sensitive materials containing such monomer and catalyst in a colloidal carrier.

Application Serial No. 715,528, filed February 15, 1958, by Steven Levinos, discloses that monomeric compounds containing a vinyl group can be photopolymerized by radiations having a wave length from $10^{-4}$ to $10^{-10}$ centimeters to yield solid products while employing as the catalyst radiation-sensitive silver compounds.

Application Serial No. 731,538, by Steven Levinos and Fritz W. H. Mueller, suggests that the catalysts for such photopolymerization be light-sensitive silver halide emulsions, whereas application Serial No. 765,275, by the same parties, proposes the use as catalysts for such photopolymerization of light-sensitive silver compounds promoted by amphoteric metal oxides.

It has now been discovered that normally liquid to solid vinyl monomers may be photopolymerized in bulk or in coated dry layers with UV light or light of the visible spectrum while employing as the catalyst zinc oxide or titanium dioxide alone or such oxides the catalytic activity of which is promoted by an oxidizable organic compound. Such method of photopolymerization and light-sensitive materials comprising a base coated with a vinyl monomer, the aforestated catalyst and a colloidal carrier constitute the purposes and objects of the present invention.

The exact mechanism according to which these catalysts induce photopolymerization in bulk or when suitably coated and dried on supports such as metal, paper, glass, film or the like is not completely understood, but it is assumed that it involves free radicals in one form or another. Redox reactions do occur in ultraviolet light or visible light irradiated suspensions of zinc oxide or titanium dioxide. Since certain redox reactions can cause photopolymerization of vinyl compounds, it is plausible to explain the conversion of light energy into chemical energy in this manner in view of the fact that we have observed that a trace of moisture is essential to promote photopolymerization. In any case, when zinc oxide or titanium dioxide dispersions alone or in combination with the aforesaid promoters in suitable matrices containing a vinyl monomer are coated on suitable supports and exposed under a negative or stencil, imagewise photopolymerization of the vinyl monomer ensues in such a manner that a sharp photoresist remains after the unpolymerized, unexposed areas are removed by washing. Similarly, vinyl monomers in the presence of water and such metal oxide catalysts are photopolymerized in bulk to hard solid monomers in short periods of time when irradiated with UV or visible light. Imagewise photopolymerization involving the aforesaid catalysts is useful in the preparation of photolithographic printing plates, rotogravure cylinders, printed circuits, preparation of microfilm and other print materials comparable to silver halide photographic paper and image transfer papers.

It has been explained that zinc oxide or titanium dioxide are per se capable of photopolymerizing vinyl monomers when irradiated with UV or visible light. It may be noted, in this connection, that very good results are also obtained when using as the titanium dioxide, the product precipitated from titanium tetra ethylate according to the procedure of H. Knoll et al., "Naturwissenschaften," vol. 45, No. 11, page 262, 1958, and the examples should be construed in this light.

The catalytic activity of the zinc oxide or titanium dioxide, however, is greatly promoted when they are used in combination either for bulk photopolymerization or for imagewise photopolymerization with oxidizable organic compounds.

The oxidizable organic materials operate to greatly promote the catalytic effect of the zinc oxide or titanium dioxide in our photopolymerization procedure. Examples of the oxidizable organic compounds found to be suitable for our purposes are the aliphatic monocarboxylic and dicarboxylic acids with from one to four carbon atoms such as formic acid, acetic acid, propionic acid, butyric acid, oxalic acid, succinic acid, or the like, the salts of such acids such as sodium or potassium formate, sodium acetate, sodium propionate, sodium butyrate, sodium or potassium oxalate, sodium malomate, sodium succinate, or the like.

The quantity of metal oxide used in the photopolymerization may range from about 1% to 200% by weight of the monomer employed. Larger amounts may, of course, be used, but no improvement in result follows from the larger amount. As a matter of fact, in bulk photopolymerization, excesses of metal oxides will settle out from a water solution of the components and, therefore, such excesses should be avoided.

The quantity of the promoter as compared to the metal oxide covers a broad range. Thus, we have used as little as .0005 g. of the promoter per gram of oxide and as much as a .65 g. of the promoter per gram of oxide. In each case, effective photopolymerization to hard solid polymers was realized.

Any normally liquid to solid monomeric compound or mixtures thereof may be used in our procedure. Suitable monomers are, for example, acrylamide, acrylonitrile, N-ethanol acrylamide, methacrylic acid, acrylic acid, calcium acrylate, methacrylamide, vinyl acetate, methylmethacrylate, methylacrylate, ethylacrylate, vinyl benzoate, vinyl pyrrolidone, vinylmethyl ether, vinylbutyl ether, vinylisopropyl ether, vinylisobutyl ether, vinylbutyrate, butadiene or mixtures of ethylacrylate with vinyl acetate, acrylonitrile with styrene, butadiene with acrylonitrile and the like.

It is recognized that the molecular weight and hence the ultimate hardness of a vinyl polymer can be increased by utilization during polymerization of a small amount of an unsaturated compound containing at least two terminal vinyl groups each linked to a carbon atom in a straight chain or in a ring. These compounds serve to cross-link the polyvinyl chains and are generally designated as cross-linking agents. Such agents are described, for example, by Kropa and Bradley in vol. 31, No. 12, of "Industrial and Engineering Chemistry," 1939. Among such cross-linking agents for our purpose may be mentioned N,N'-methylene-bis-acrylamide, triallyl cyanurate, divinyl benzene, divinyl ketones and diglycoldiacrylate.

The cross-linking agent is generally employed in an amount ranging from 10 to 50 parts of monomer to each part of the cross-linking agent. It is understood that the greater the quantity of cross-linking agent within such range, the harder the polymer obtained. If desired, these cross-linking agents can be used by themselves in the absence of any other vinyl monomers.

Bulk polymerization is usually carried out in a water or organic solvent solution of the monomer. The metal oxides should be dispersed in the solvent solution of the monomer and if the solution be aqueous, it is recommended that a dispersing agent be employed such as those described in application Serial No. 715,528. This will operate to prevent to a large extent the settling out of the metal oxide. If an organic solvent system is used, provisions must be made for the presence in the system of a small quantity of water, say about .1 to 5% by weight. The water may be added as such or may be supplied by incorporating in the reaction mixture a humectant such as ethylene glycol, glycerin or the like. When these substances are present, say in an amount of a few percent by weight of the mixture, they absorb water from the atmosphere to permit photopolymerization to proceed.

Coatings are prepared by dispersing the oxide in a colloidal carrier along with the monomeric compound and the oxide if such be used. To facilitate coating, dispersing agents such as saponin or those mentioned in application Serial No. 715,528 may be utilized. A humectant such as glycerin or glycol is preferably added.

The invention will be illustrated by the following examples, but it is to be understood that the invention is not restricted thereto.

*Example I*

The following composition was prepared:

| | G. |
|---|---|
| Acrylamide | 180 |
| N,N'-methylene-bis-acrylamide | 7 |
| Water | 120 |

To 6 cc. of this mixture, were added about 100 mg. of zinc oxide. The mixture confined in a test tube was exposed to the light of a 150 watt tungsten lamp at a distance of 6". Photopolymerization to a solid mass ensued in a period of 17 minutes.

*Example II*

To 5 cc. of the composition of Example I were added 25 mg. of zinc oxide. The mixture was confined in a test tube and exposed to the light of a 150 watt tungsten lamp at a distance of 6". Photopolymerization ensued in a period of 13½ minutes.

*Example III*

To 5 cc. of the composition of Example I were added 25 mg. of titanium dioxide and the mixture irradiated as in Example II. Photopolymerization ensued in a period of 19 minutes.

*Example IV*

The following composition was prepared and will hereinafter be referred as as W-5:

| | G. |
|---|---|
| Acrylamide | 180 |
| N,N'-methylene-bis-acrylamide | 7 |
| Water | 120 |

Coatings were prepared on a hardened gelatin layer on film using the following formulation:

| | |
|---|---|
| 10% gelatin | 450 ml. |
| Titanium dioxide | 60 g. in 60 ml. of water. |
| W-5 | 90 ml. |
| Saponin 8% | 7.2 ml. |
| Glycerin | 3 ml. |

To 25 g. of the suspension were added before coating 5 ml. of a solution containing the quantities of promoter as indicated below. Each 30 g. of the coating suspension or "solution" contained 2.5 g. of oxide. A number of coatings were prepared and exposed for different time internals to a tungsten lamp (375 watt) at 30". The speeds indicate the minimum amount of time required to obtain a sharp relief image. The relief was obtained by washing away the unpolymerized parts of the emulsion.

| | |
|---|---|
| Promoter | Propionic acid. |
| Ratio of propionic acid to titanium dioxide | 1 to 25. |
| Time of photopolymerization | 30 seconds. |

A similar coating omitting the propionic acid required 15 minutes to obtain the sharp relief image by photopolymerization.

*Example V*

The procedure was the same as in Example IV excepting that the ratio of propionic acid to titanium dioxide was 1 to 50. In this case, photopolymerization required 45 seconds.

*Example VI*

The procedure was the same as in Example IV excepting that the propionic acid was replaced by formic acid and the ratio of promoter to titanium dioxide was 1 to 30. Photopolymerization to produce the desired relief image required 10 seconds.

*Example VII*

The procedure was the same as in Example IV excepting that the propionic acid was replaced by oxalic acid and the ratio of the promoter to the oxide was 1 to 50. Photopolymerization required 5 to 10 seconds.

No photopolymerization took place in the same system when the oxide was eliminated.

*Example VIII*

The procedure was the same as in Example IV excepting that the titanium dioxide was replaced by zinc oxide (2.5 g.) and the ratio of the promoter to the oxide was 1 to 33. Photopolymerization to the desired relief image required 10 seconds.

*Example IX*

The procedure was the same as in Example IV excepting that there were added to the solution before coating 10 millimols of sodium formate and propionic acid was omitted. Photopolymerization required 10 seconds.

With a concentration of sodium formate of 2.5 millimols and the same quantity of titanium dioxide used in Example IV, i.e., 2.5 g. per 30 g. of coating solution, photopolymerization required 15 seconds.

By reducing the concentration of sodium formate to 1.2 millimols, photopolymerization ensued in 2½ minutes.

*Example X*

The procedure was the same as in Example IV excepting that the titanium dioxide was replaced by 2½ g. of zinc oxide per 30 g. of coating solution and the propionic acid was replaced by 10 millimole of sodium formate. Photopolymerization to the desired relief image required 10 seconds.

*Example XI*

The procedure was the same as in Example IV excepting that the propionic acid was replaced by 1.2 millimoles of sodium oxalate, the same quantity of titanium dioxide being employed. Photopolymerization required 30 seconds.

*Example XII*

The procedure was the same as in Example IV excepting that the titanium dioxide was replaced by 2.5 g. of zinc oxide and the propionic acid was replaced by 1.2 millimoles of sodium oxalate. Photopolymerization required 40 seconds.

*Example XIII*

The procedure was the same as in Example IV excepting that the propionic acid was replaced by sodium succinate and the ratio of promoter to the oxide was 1 to 20. Photopolymerization ensued in 30 seconds.

Example XIV

The procedure was the same as in Example IV excepting that the acrylamide was replaced by calcium acrylate. The results were similar to those obtained in Example IV.

Example XV 10 g. of N-tertiary-butyl acrylamide were dissolved in 30 g. of a 10% aqueous solution of ethyl cellulose and toluene.

1 g. of a dispersing agent—lauryl sulfate—was added and in this oily solution 4 to 5 g. of zinc oxide were dispersed. The solution was placed in a reactor and exposed using the technique of Example I. Photopolymerization occurred in a matter of minutes yielding a solid hydrophobic polymer.

Example XVI

A composition was prepared from the following components:

| | | |
|---|---|---|
| Acrylamide | g | 180 |
| N,N'-methylene-bis-acrylamide | g | 7 |
| Water | cc | 120 |
| Zinc oxide | g | .02 |

To 1 cc. of this composition there were added 1 cc. of a 10% dispersion of vinyl acetate and 1 cc. of an aqueous solution containing 2.5 mg. of sodium formate. Irradiation of this composition to the light of a 500 watt tungsten lamp at a distance of 5" caused photopolymerization to ensue in a period of a few minutes.

Example XVII

A composition was prepared from the following components:

| | | |
|---|---|---|
| Acrylamide | g | 180 |
| N,N'-methylene-bis-acrylamide | g | 7 |
| Water | cc | 120 |

To 6 cc. of this solution were added 1 g. of acrylonitrile, .02 g. of zinc oxide and 25 mg. of sodium formate. By irradiating the composition at a distance of 6" from the light source while utilizing a 500 watt tungsten lamp, rapid photopolymerization occurred.

Example XVIII 1 g. of vinyl acetate was dispersed in water to produce a 1% dispersion. To this composition were added .02 g. of zinc oxide and 3.6 mg. of sodium oxalate. By irradiating the composition with the light source of Example XVII at a distance of 5", photopolymerization occurred in a matter of minutes.

Example XIX

The following composition was prepared:

| | G. |
|---|---|
| Methacrylamide | 50 |
| N,N'-methylene-bis-acrylamide | 4 |
| Water | 7 |

To this composition there were added .02 g. of titanium dioxide and 250 mg. of sodium formate.

The composition was irradiated with a 150 watt tungsten lamp at a distance of 6". The mass polymerized after an exposure of a few minutes.

Example XX 5 g. of styrene were dissolved in 2.5 g. of a 10% solution of ethyl cellulose and toluene. After the addition of 3 drops of a 25% solution of lauryl sulfate, .02 g. of titanium dioxide and 250 mg. of sodium oxalate were dispersed with the aid of a Waring Blendor. The composition was placed in a reactor and exposed while using the technique of Example XVII. Photopolymerization occurred in a matter of minutes yielding a solid hydrophobic polymer.

Modifications of the invention will occur to persons skilled in the art. Thus, in lieu of any of the monomers mentioned in the examples, we may use any of the vinyl monomers mentioned above. Similarly, catalytic systems other than those of the examples using the combinations specified may be employed. We, therefore, do not intend to be limited in the patent granted except as necessitated by the appended claims.

This application is a continuation-in-part of our co-pending application Serial No. 783,725, filed December 30, 1958, now U.S. Patent No. 3,041,172, patented June 26, 1962.

We claim:

1. Light-sensitive photographic material comprising a base coated with a colloidal carrier containing a normally liquid to solid dispersible monomer containing the grouping $CH_2=C=$ and a white light-sensitive catalyst capable of inducing photopolymerization of said monomer and selected from the class consisting of zinc oxide and titanium dioxide in admixture with a compound selected from the class consisting of aliphatic monocarboxylic acids having from 1 to 4 carbon atoms, aliphatic dicarboxylic acids having from 2 to 4 carbon atoms, and the alkali metal salts of said acids, said catalyst being the sole catalyst present in said carrier.

2. The light-sensitive photographic material of claim 1 wherein the catalyst is titanium dioxide in admixture with propionic acid.

3. The light-sensitive photographic material of claim 1 wherein the catalyst is titanium dioxide in admixture with formic acid.

4. The light-sensitive photographic material of claim 1 wherein the catalyst is a mixture of titanium dioxide and sodium formate.

5. The light-sensitive photographic material of claim 1 wherein the catalyst is a mixture of zinc oxide and formic acid.

6. The light-sensitive photographic material of claim 1 wherein the catalyst is a mixture of titanium dioxide and the water soluble alkali metal salt of oxalic acid.

7. The process of producing high molecular weight, solid polymers from monomeric vinyl compounds which comprises subjecting a normally liquid to solid monomer having the grouping $CH_2=C=$ to photopolymerization by exposing the monomer to a light source ranging in length from those of the U.V. to the visible sprectrum in the presence of a metal oxide capable of inducing photopolymerization of said monomer and selected from the class consisting of zinc oxide and titanium dioxide in admixture with a compound selected from the class consisting of aliphatic monocarboxylic acids having from 1 to 4 carbon atoms, aliphatic dicarboxylic acids having from 2 to 4 carbon atoms, and the alkali metal salts of said acids, said catalyst being the sole catalyst present in said carrier.

8. The process as defined in claim 7 in which the catalyst is titanium oxide in admixture with propionic acid.

9. The process as defined in claim 7 in which the catalyst is titanium dioxide in admixture with formic acid.

10. The process as defined in claim 7 in which the catalyst is a mixture of titanium dioxide and an alkali metal salt of formic acid.

11. The process as defined in claim 7 in which the catalyst is a mixture of zinc oxide and an alkali metal salt of oxalic acid.

12. The process as defined in claim 7 in which the catalyst is a mixture of titanium dioxide and an alkali metal salt of oxalic acid.

13. A printing plate comprising a base coated with a light-sensitive photographic emulsion comprising a colloidal carrier containing a normally liquid to solid monomer having the grouping $CH_2=C=$ and a light-sensitive catalyst capable of inducing photopolymerization of said monomer and selected from the class consisting of zinc oxide and titanium dioxide in admixture with a compound selected from the class consisting of aliphatic monocarboxylic acids having from 1 to 4 carbon atoms, aliphatic dicarboxylic acids having from 2 to 4 carbon atoms, and the alkali metal salts of said acids, said catalyst being the sole catalyst present in said carrier.

14. A printing plate according to claim 13 wherein the catalyst is zinc oxide in admixture with an alkali metal formate.

15. A printing plate according to claim 13 wherein the catalyst is zinc oxide in admixture with an alkali metal oxalate.

16. A printing plate according to claim 13 wherein the catalyst is titanium oxide in admixture with an alkali metal oxalate.

References Cited in the file of this patent

UNITED STATES PATENTS

| | | |
|---|---|---|
| 2,367,660 | Agre | Jan. 23, 1945 |
| 2,367,661 | Agre | Jan. 23, 1945 |
| 2,413,973 | Howk et al. | Jan. 7, 1947 |
| 2,435,429 | Evans et al. | Feb. 3, 1948 |
| 2,480,749 | Marks | Aug. 30, 1949 |
| 2,491,409 | Kropa et al. | Dec. 13, 1949 |
| 2,500,023 | Burk | Mar. 7, 1950 |
| 2,942,561 | Schmerling | Feb. 6, 1960 |
| 2,947,716 | Cornell et al. | Aug. 2, 1960 |
| 3,041,172 | Evans et al. | June 26, 1962 |
| 3,050,390 | Levinos et al. | Aug. 21, 1962 |

UNITED STATES PATENT OFFICE
CERTIFICATE OF CORRECTION

Patent No. 3,118,767 January 21, 1964

Helene D. Evans et al.

It is hereby certified that error appears in the above numbered patent requiring correction and that the said Letters Patent should read as corrected below.

Column 1, line 13, for "normal" read -- normally --; column 2, line 40, strike out "a"; column 3, line 20, after "and" insert -- the promoter for --; line 55, for "as", first occurrence, read -- to --; same column 3, lines 74 and 75, for "internals" read -- intervals --; column 8, line 11, the reference should appear as shown below instead of as in the patent:

2,924,561 Schmerling--------Feb. 9, 1960

Signed and sealed this 23rd day of June 1964.

(SEAL)
Attest:

ERNEST W. SWIDER
Attesting Officer

EDWARD J. BRENNER
Commissioner of Patents